United States Patent [19]

Gilbu

[11] E Re. 29,636

[45] Reissued May 23, 1978

[54] MANHOLE AND METHOD OF MANUFACTURE

[75] Inventor: Agnar Gilbu, Conroe, Tex.

[73] Assignee: Owens-Corning Fiberglas Corporation, Toledo, Ohio

[21] Appl. No.: 760,252

[22] Filed: Jan. 17, 1977

Related U.S. Patent Documents

Reissue of:

[64] Patent No.: 3,938,285
Issued: Feb. 17, 1976
Appl. No.: 538,984
Filed: Jan. 6, 1975

U.S. Applications:

[63] Continuation of Ser. No. 322,344, Jan. 10, 1973, abandoned.

[51] Int. Cl.[2] ..... E02D 29/14

[52] U.S. Cl. ..... 52/20; 52/309.1; 404/25

[58] Field of Search ..... 52/19-21, 52/309, 169.6; 285/293; 220/DIG. 14; 215/1 C; 404/25; 137/363, 583-585

[56] References Cited

U.S. PATENT DOCUMENTS

| | | | |
|---|---|---|---|
| 521,869 | 6/1894 | Shearer | 137/583 |
| 876,392 | 1/1908 | Peterson | 52/20 |
| 2,050,023 | 8/1936 | Slayter | 285/293 |
| 2,718,583 | 9/1955 | Noland | 219/312 |
| 3,097,166 | 7/1963 | Monson | 52/169.6 |
| 3,111,569 | 11/1963 | Rubenstein | 52/309.17 |
| 3,235,289 | 2/1966 | Jones | 285/293 |
| 3,360,147 | 12/1967 | Schaefer | 215/1 C |
| 3,672,103 | 6/1972 | Kost | 52/169.6 |
| 3,715,958 | 2/1973 | Crawford | 52/21 |
| 3,850,801 | 11/1974 | Pearson | 210/170 |

FOREIGN PATENT DOCUMENTS

| | | | |
|---|---|---|---|
| 999,467 | 1/1952 | France | 215/1 C |
| 533,918 | 10/1955 | Italy | 52/20 |
| 81,878 | 8/1919 | Switzerland | 52/20 |

*Primary Examiner*—Ernest R. Purser
*Assistant Examiner*—Henry Raduazo
*Attorney, Agent, or Firm*—Ronald C. Hudgens; Patrick P. Pacella; Paul J. Rose

[57] ABSTRACT

A preformed manhole suitable for use underground is made of reinforced plastic. The manhole comprises a dome section integrally joined at one end of a tubular body by an endless band of reinforced plastic. The dome is arcuately shaped to provide resistance to buckling, and in one specific embodiment is generally hemispherical. The dome includes a manway and a load bearing shoulder for supporting the manhole cover and frame. An upwardly extending rib or collar is provided around the manway to provide additional stiffness and stability.

The method for making the preformed manhole is also disclosed. The tubular body is made by applying resin, glass fiber reinforcement, and particulate filler on an endlessly advancing mandrel. The dome is made by applying resin and glass fibers on the surface of a rotating mold. The dome and body are joined by laying-up resin and glass over their mated ends.

39 Claims, 8 Drawing Figures

MANHOLE AND METHOD OF MANUFACTURE

Matter enclosed in heavy brackets [ ] appears in the original patent but forms no part of this reissue specification; matter printed in italics indicates the additions made by reissue.

This is a continuation of application Ser. No. 322,344, filed Jan. 10, 1973, abandoned.

The present invention relates to manholes or similar structures used to provide access to underground facilities such as sewers, pipelines, pump stations, valves, etc.

In the construction of large underground pipelines and sewers it is the customary practice to put manholes at frequent intervals to permit access for inspection, maintenance, and repair of the pipeline or associated facilities. Heretofore these manholes have usually been made of plain or reinforced concrete or of brick masonary.

Until recently most manholes were formed in place by either casting concrete in molds or forms, or by laying up brick and mortar. However, fabricating a manhole in place requires a substantial amount of field labor. Accordingly, with rising labor costs these manholes are becoming a more costly part of the system.

Furthermore the practice of forming manholes in place presents an additional problem for the contractor. The time required to fabricate the manhole in place is extensive, not only because of the labor involved, but also because of the need for time to cure the concrete or mortar. During this time the excavation must necessarily be left open and exposed to the risks of flooding or contamination from silt and other materials washing into it.

Recently prefabricated manholes, usually of precast concrete, have become popular. Because of the weight of concrete, most of these manholes are made in sections which are assembled at the excavation site. However, the assembly of these manholes still requires a substantial amount of time and labor as well as the use of heavy and expensive equipment. Furthermore, since concrete and brick are not easily machined or fabricated it is difficult to fit manholes made of these materials to the pipe or sewer lines.

Another significant problem relating to manholes is that of leakage. Owners, as well as servicemen, are of course concerned about the washing of silt and other contaminates into leaky manholes, since these materials can build-up and interfere with the access to the enclosed facility. Equally important is the ecological concern about the contamination of water lines and sewer systems. However, despite attempts to design special joint configurations and gaskets to provide water tight seals in the prior art manholes, leaks can and still do occasionally occur. Leaks also result from the attack of corrosive ingredients found in soil, sewage, and industrial waste waters. Many of the materials used to make manholes are not immune to these corrosive environments.

It is therefore an object of the present invention to provide a preformed manhole suitable for underground installation which is lightweight and which can be quickly installed.

It is another object of the invention to provide a preformed manhole that can be easily fabricated and fitted to an underground facility such as a sewer or pipeline.

It is still another object of the invention to provide a manhole that is leakproof and immune to most corrosive environments encountered in sewer systems and industrial applications.

It is still another object to provide a one-piece manhole which can be handled and installed quickly with the use of relatively light equipment.

Finally it is an object of the invention to provide a process for making a manhole having the desired features described above.

These and other objects are achieved in the present invention in which a preformed manhole is made out of a strong but lightweight material, preferably glass fiber reinforced plastic. The manhole comprises a tubular body adapted for enclosing an underground facility, and a dome section integrally joined to one end of the tubular body. The dome is provided with an opening or manway to permit entry into the manhole.

The wall of the tubular body is designed with a high compressive strength to withstand axial loads as well as the pressure of the surrounding soil. The wall of the dome section forms a surface of double curvature interrupted only by the manway, and is designed with high shear and flexural strength properties.

The dome section may also be provided with an inwardly extending load bearing shoulder circumscribing the manway opening. This shoulder serves as a base for a build-up of material to adjust a conventional manhole cover and frame to the desired elevation.

A vertically upstanding lip can be provided around the perimeter of the manway to act as a reinforcing rib which will aid in distributing an eccentric load evenly over the dome surface.

As mentioned in the preferred embodiment, the manhole of the present invention is made of polyester resin reinforced with glass fibers. Also in this embodiment, the dome is hemispherically shaped while the body is cylindrical. The dome and body are integrally joined by an endless band of reinforced plastic overlaying the connection of the two members.

Since the wall of the cylindrical body is primarily under compressive loading in the installed condition, it has been found that a particular filler, such as sand, can be added to the composite wall to improve the compressive strength. Although a particulate filler could also be used in the wall of the dome section, there may be a trade off in shear strength if the proportion of filler is too high. Therefore, in the specific embodiment later described in detail, the dome section comprises resin reinforced with only chopped glass strand to form a composite with optimum shear strength for the application.

In the first instance, the manhole of the present invention advances the art of underground manholes by substituting a strong, lightweight and corrosive resistant material for those used heretofore. It can be easily installed with the use of relatively light equipment, and in a much shorter time than the prior art manholes.

The design of the present manhole also incorporates shapes and other improvements which co-operate to advance the structural performance as well. Further, because it has only one joint, which is made in the factory, the manhole of the invention greatly reduces the risk of leakage.

The present invention also embraces a process for making the manhole described above. Briefly the process comprises forming the dome section by depositing liquid resin and chopped glass reinforcements on the surface of a rotating mold and curing the resin. The tubular body is formed by applying resin, glass fiber reinforcement, and a particulate filler on the surface of a rotating mandrel and curing the resin. The preformed dome and tubular body are then joined together with a lay-up of resin and reinforcement.

In the specific process to be described later, the tubular body is formed on an endlessly advancing mandrel of the type described in U.S. Pat. No. 3,464,879. The dome section is provided with a radially enlarged lip at its large end to form a female connection for mating with an end of the tubular body. This facilitates alignment and assembly of the two parts.

Although the process as described consists of forming the dome and tubular body by separate operations, it is readily apparent that the whole manhole could be formed at one time on a specially designed [manhole.] *mandrel.* However, since such a process is likely to require more expansive equipment and may reduce the flexibility of the system, it is not discussed further here.

Having thus summarized the invention, a more detailed description follows with reference to the attached drawings which form a part of this specification and of which:

Figure 1:
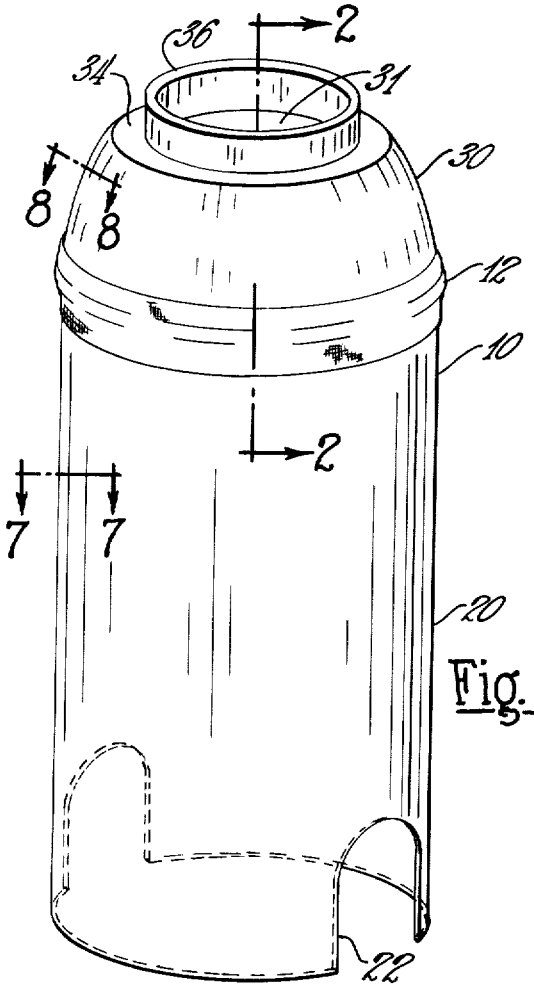
FIG. 1 is a view in perspective showing a preformed manhole embodying the present invention.
Figure 3:
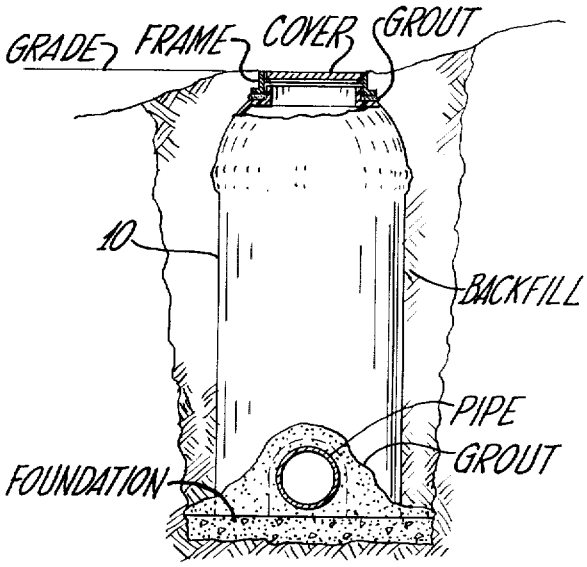
FIG. 3 is an elevational view of the manhole of FIG. 1 as shown in a typical installed condition.
Figure 2:
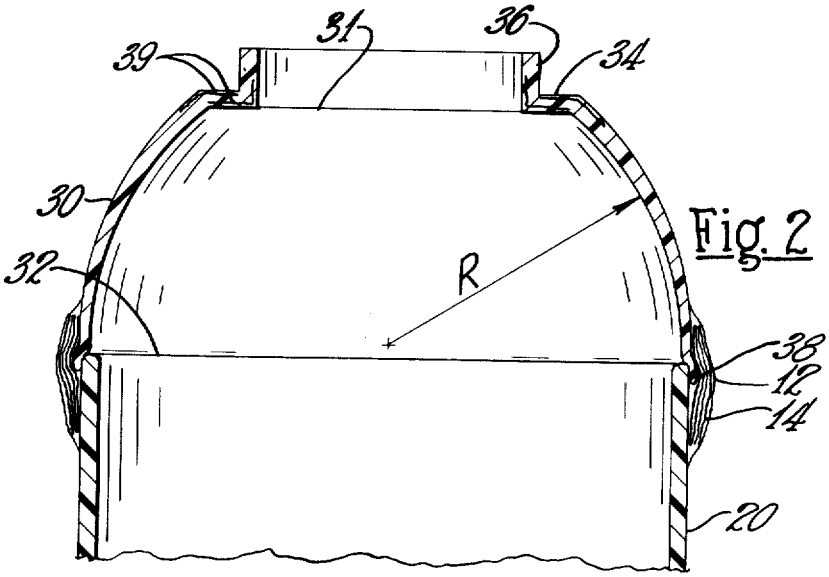
FIG. 2 is an enlarged view in section, showing the upper portion of the manhole of FIG. 1, as taken along the line 2—2 in FIG. 1.

The manhole, indicated generally by the numeral 10 in FIGS. 1, 2, and 3, consists of a tubular body 20 and a dome section 30 integrally joined together by an endless band of reinforced resin 12. Although shown as a cylinder, the tubular body section can be of any suitable cross section and size adapted to allow working room for a man to operate inside. The cylindrical shape is particularly well suited for underground structures and is easily manufactured.

The dome section 30, as shown in the drawings, is a hemisphere interrupted by the manway 31. Opposite the manway 31, the open end 32 of the dome is sized to mate with one end of the tubular body 20. In order to make alignment of the dome and body easier, the open end 32 is radially enlarged to form a lip 38 adapted to fit over the end of the tubular body.

The endless band of reinforced resin 12 comprises several layers of reinforcement 14, such as glass fiber mat or woven roving, in a matrix of hardened resin overlaying the connection between the dome 30 and body 20. The endless band 12 extends partially onto the surfaces of both the body and dome, and is integrally bonded to both sections.

As mentioned earlier, it is desirable to have the wall of the dome 30 form a continuous arc or curve between the open end and the manhole. It is even more preferable to have the wall curved in two directions at substantially all points thereon. This shape is better suited to resist buckling due to external loading from above. Where the body section 20 is cylindrical, the dome 30 can conveniently be made hemispherical in the region between the manway 31 and the open end 32. In FIG. 2, the dome is shown hemispherical with a radius R.

The dome 30 also includes an integral, load bearing shoulder 34 extending annularly around the manway as shown in FIG. 1. Referring to FIG. 2, the shoulder 34 serves as a base on which a build-up of brick and mortar, cement, or other material can be formed to adjust a standard manhole cover support frame to the proper elevation or grade.

The interruption of the convex shape of the dome by the manway 31 has the effect to weaken the otherwise stiff curvilinear structure. This problem can be suitably remedied by including an integral, upwardly extending reinforcing rib or collar 36 immediately circumscribing the manway 31. It has been demonstrated that the ring stiffener 36 is effective to prevent excessive deflection of the shoulder 34 due to concentrated loads by distributing the load around the shoulder and ultimately over the curved surface of the dome. Thus the rib 36 cooperates with the shape of the dome to enhance the buckling resistance of the structure.

The rib 36 also serves an incidental function as an alignment means for the build-up of materials on the shoulder 34.

It can be seen in FIG. 2 that high stress regions exist where the collar 36 joins the annular shoulder 34, and where the shoulder 34 joins the curved wall of the dome. Accordingly, it may be avantageous to incorporate additional reinforcement in these regions. In FIG. 2, a layer of woven roving 39 has been incorporated on the tension side of the loaded laminate in each of the high stress regions.

The design of the dome has been further refined by tapering the thickness of the wall in inverse proportion to the shear and bending stresses which would result from external loads on the shoulder 34. Thus the dome wall is thickest in the region of the collar 36 and shoulder 34 and thinnest in the region of the open end where the load is translated into compression.

Similarly it is understood that the wall of the tubular body 20 could be made to gradually increase from the top to the bottom of the tube in accordance with the greater compressive forces due to the depth of bury. However, for more flexibility it has proven convenient to make the tubing in continuous lengths of constant wall thickness. The tubing can subsequently be cut into any specific length, within a reasonable design range, without worry over the specific wall thickness.

As mentioned previously, both the dome 30 and the tubular body 20 are preferably made of a hardenable resin reinforced with glass fibers. Unsaturated polyester resins find wide use in the reinforced plastics industry, and since these resins are resistant to attack by most of the corrosive environments in which manholes are commonly used, they are generally suitable for this application. However, in specific applications where special corrosion problems exist other thermosetting resins, including acrylics, furans, epoxies, phenolics melamines, and silicones, may be substituted with appropriate design changes to compensate for differences in other physical properties. Although not always necessary, it is generally recommended that the resins in the dome 30, the tubular body 20 and the joint 12 be the same.

The glass fiber reinforcement may be in the form of chopped or continuous strand mats, woven roving, continuous filament windings, chopped strands or rovings, woven or non-woven scrim, glass cloth, or preoriented tapes. Because of the need for tensile strength in the circumferential direction, as well as axially, layers of glass mat or woven roving 14 are best suited as the reinforcement of the endless joint 12.

On the other hand, chopped lengths of glass strand or roving have been found particularly suitable for the tubular body 20 and the dome 30. When randomly distributed throughout the resin wall the chopped strands provide reinforcement in all directions, thus allowing the designer to make the most use of the shape of his structure. Chopped glass strands are also well suited for application in the process discussed below.

FIG. 3 shows the manhole 10 in a typical underground installation. The manhole is set on a concrete foundation. Since the manhole 10 is much lighter the pad does not need to be as thick as it is in the case of concrete or brick manholes. The cut away portion 22 of the body fits over the pipe or sewer line as shown. The cutout 22 can be easily made with a portable high speed saw, while in the prior art manholes, such cutouts were more difficult to make. Concrete or grout fills the lower region of the pit and seals around the bottom of the manhole and around the pipeline. The walls of the manhole are snuggly surrounded by the back fill of the excavation.

Normal installation procedures call for the pit to be made slightly deeper than necessary. Consequently the top of the manhole is slightly below grade level and it is necessary to provide some adjustment for the manhole cover frame. This is accomplished by a build up of grout, or brick and mortar, on the shoulder 36 of the manhole. The cover frame rests on the build up in registry with the collar 34.

When installed as shown in FIG. 3, the manhole is substantially fluid tight in the regions below grade level. Thus, unlike many of the prior art manholes, the present manhole does not allow silt and other contaminants to seep or flow into the manhole or sewer line.

As mentioned earlier, the unique combination of shapes and materials makes the manhole particularly well suited for underground application. Referring to FIG. 3 the cylindrical body section of the manhole is subjected to external crushing forces due to the surrounding earth. However when properly designed the composite wall of the body 20 has a high modulus of elasticity and possesses the stiffness necessary to withstand these forces.

Manholes, especially those to be located under roadways, parking lots, etc., must also withstand enormous loads imposed on the manhole cover and frame. These forces are born by the shoulder 34 of the dome 30 and distributed through the walls of the manhole to the underlying base. The shape of the dome and the composite wall construction combine to provide sufficient stiffness to convert the bending movements imposed on the wall of the dome into vertical compressive forces on the wall of the tubular body 30. As has already been pointed out, the vertical lip 36, provides additional stiffness to the dome structure and helps to distribute the load evenly.

The compressive forces are transferred to the tubular body 20, through the offset end 38 of the dome. Here the endless band 12 contributes to the structure by providing reinforcement or hoop strength to prevent distortion or deflection of the offset end 38.

Finally it should also be noted that the cutout 22 is made slightly larger than the diameter of the pipe, and of such a depth that the loading on the manhole is transmitted to the base and not on to the pipe or sewer line.

Figure 4:
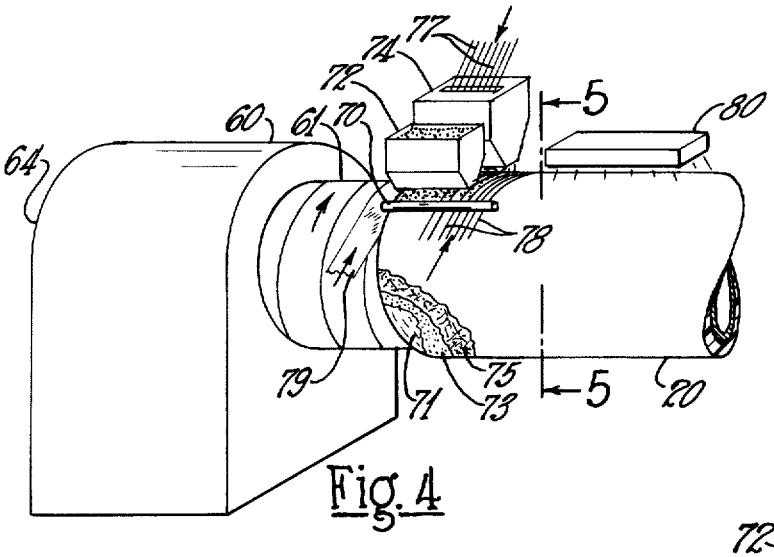
FIG. 4 is an elevational view in perspective showing a method and apparatus for making the tubular part of the manhole in FIG. 1.
Figure 5:
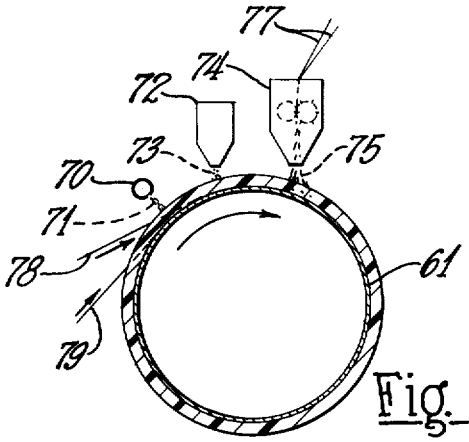
FIG. 5 is a cross-sectional view of the apparatus of FIG. 4 as taken along the line 5—5 in FIG. 4.
Figure 6:
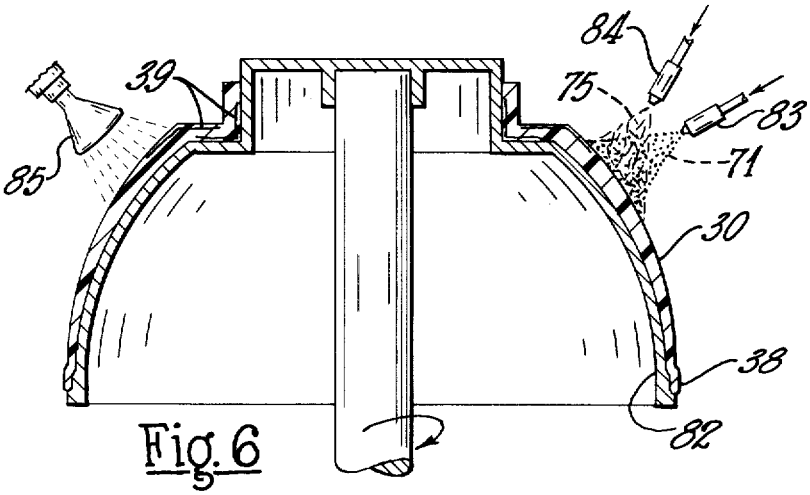
FIG. 6 is an elevational view partly in cross section, showing a method and apparatus for forming the dome section of the manhole of FIG. 1.

Referring now to FIGS. 4–6, an apparatus and process for making the manhole 10 is shown. FIGS. 4 and 5 show a rotating mandrel 60 adapted to produce the tubular body in any desired length or continuously. The mandrel, consists of an endlessly revolving and advancing surface 61. The surface 61 is formed by a recirculating, helically wound metal band which is supported on a rotating support structure not shown. The support structure and mandrel surface are cantilevered from a support and drive system indicated generally as 64. Further description of the mandrel is found in U.S. Pat. No. 3,464,879.

The apparatus associated with the mandrel 60 includes a resin applicator 70, a glass strand chopper 74, and a sand feeder 72, disposed in spaced relation to mandrel surface 61. The order in which the various materials are applied to the mandrel is determined by the width of the applicator 70, chopper 74, and sand feeder 72, and by their respective positions both along the length and about the periphery of the mandrel.

The first step in the process usually consists of covering the surface of the mandrel with a suitable release agent to facilitate separation of the cured laminate from the mandrel surface 62. The release agent shown here is a helically wrapped layer of plastic film 79.

The formation of the composite wall of the tubular body 20 begins with the application of a thin coating of resin 71 from the applicator 70. It is desirable to have an inner surface coating of resin to insure that the glass fiber reinforcement is not exposed. This prevents moisture from wicking along exposed fibers and penetrating the laminate to cause deterioration of the reinforcement and loss in laminate properties.

As the mandrel surface 61 rotates and advances, it passes next under the feeder 72 and sand 73 is fed onto the wet resin. The sane serves twofold purpose in the plastic composite. First it serves as a filler to bulk the composite and improve its elastic modulus. Secondly it improves the abrasion resistance of the surfaces of the composite wall.

The mandrel surface next passes under the chopper 74 which cuts continuous glass rovings 77 into chopped lengths 73 and deposits them on the still wet resin. The chopped strands are deposited randomly. The surface 61 next passes again under the elongated resin applicator 70 and additional liquid resin is applied over the chopped strand.

During subsequent revolutions of the mandrel, additional layers of resin, glass strands, and sand are built up until the desired wall thickness is reached. The relative proportions of resin, glass, and sand in each layer can be varied according to predetermined design. However, the resin will flow and blend the layers together to form a composite comprising glass strands and sand in a monolithic resin matrix.

Until the resin has had time to gel, the wet laminate may have a tendency to flow or slide on the rotating mandrel. Therefore it has been found desirable in some instances to wind a series of spaced continuous strands 78 over the laminate as a mechanical stabilizer. Although not specifically added for additional reinforcement, these windings 78 will provide some additional hoop stiffness and tensile strength in the laminate.

Once the composite wall is built up to the desired thickness the resin is cured. If necessary a heat source 80 can be used to accelerate the cure. The cured laminate is cut to length as it advances off the end of the mandrel surface 61.

Referring now to FIG. 6, the dome 30 is formed in a similar manner by depositing chopped glass fibers 75 and resin 71 on the surface of a rotating mold 82. The mold surface conforms to the shape of the dome 30 described earlier. By controlling the traversing speed of the resin applicator 83 and the chopped strand gun 84, the thickness of the wall can be varied as shown. Furthermore in the areas where the wall shape changes sharply, and where high stress concentrations result, additional reinforcement is added. It has been found that one or more layers 39 of woven roving applied, usually by hand, in these areas is satisfactory.

Again after the desirable wall thickness is built up, the resin is cured to a self-supporting state. Again the cure can be accelerated by the use of a heat source 85.

After it is cured the dome 30 is removed from the mold and joined to the body section 20. As shown in FIG. 2, the offset edge 39 of the dome fits over one end of the body 20. Layers of reinforcement 14, such as woven roving or glass mat, impregnated with resin are then wound around the connection. The layers of reinforcement are wide enough to extend substantially onto the wall of both sections 20 and 30. The resin is cured to effect a bond with the two wall sections.

The cutout 22 in the manhole is usually made at the application site. Of course, where the pipe size is known in advance, the cutout can be made at the factory.

Figure 7:
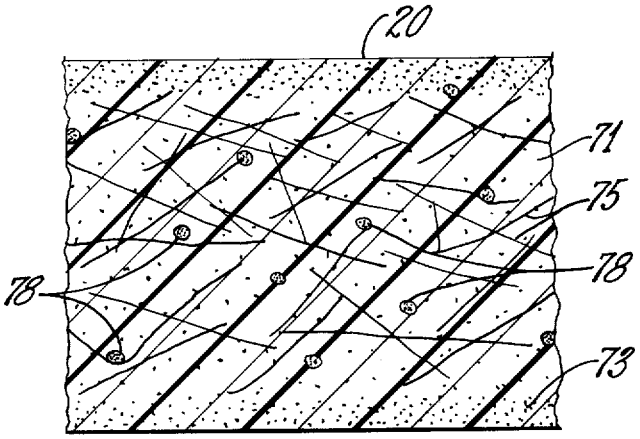
FIG. 7 is an enlarged sectional view through a portion of the wall of the manhole of FIG. 1, as taken along the line 7—7 of FIG. 1.

FIG. 7 shows the construction of the composite wall of the tubular body 20 as formed by the process of FIGS. 4 and 5. The wall comprises chopped glass strands 75, and particles of sand 73, randomly dispersed throughout a matrix of hardened resin 71. The few hoop windings 78 used to stabilize the wet laminate on the mandrel are also shown. The laminate of FIG. 7 has a high elastic modulus and good compressive strength and is therefore well suited for the wall of the tubular body 20. Although a greater concentration of sand particles is shown adjacent the surfaces of the laminate in order to provide better abrasion resistance, the distribution of the sand, as well as the reinforcement, can be proportioned throughout the laminate according to the design needs of the particular application.

Figure 8:
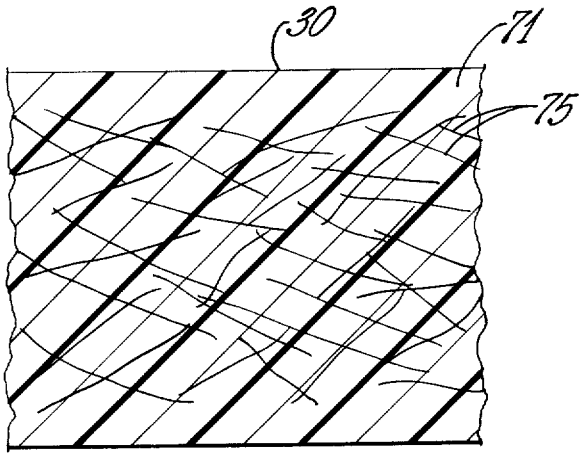
FIG. 8 is an enlarged sectional view of another portion of the wall of the manhole of FIG. 1, as taken along the line 8—8 in FIG. 1.

FIG. 8 shows the construction of the composite wall of the dome 30 as formed by the process of FIG. 6. The composite comprises a matrix of resin 71 having chopped glass 75 strands randomly dispersed throughout. This laminate possesses high shear and flexural strength properties and is preferred for the dome 30.

Having thus described the invention with reference to particular embodiments shown, modifications and variations of those embodiments will occur to those skilled in the art. These modifications and variations are within the broad scope of the invention as defined in the claims which follows.

I claim:

1. A preformed manhole enclosure suitable for use underground and made of glass fiber reinforced plastic, the manhole enclosure comprising a tubular body and a dome at an upper end of the tubular body, the dome including a wall of continuous double curvature and having a manway providing access to the interior of the tubular body, the dome further including a load bearing shoulder and an integral stiffening collar, the load bearing shoulder circumscribing the manway and presenting a generally planar, upwardly facing annular surface for supporting a load, the stiffening collar extending generally perpendicularly upwardly from an inner edge of the shoulder and being effective to stiffen the shoulder against deflection due to externally applied loads, and a central vertical section through the dome being defined on each of opposite sides of the manway by a downwardly concave curved section of the wall extending upwardly from the tubular body and curving radially inwardly of the dome in a downwardly concave curve, a section of the load bearing shoulder extending radially inwardly of the dome from an upper end of the downwardly concave section of the wall, and a section of the stiffening collar extending upwardly from an inner end of the section of the load bearing shoulder.

2. The manhole enclosure of claim 1, wherein the body is cylindrical and the dome is generally hemispherical.

3. The manhole enclosure of claim 1, wherein said dome and said body have mating ends and are joined together by an endless band of reinforced plastic overlaying the mated connection and bonded to both said dome and said body.

4. The manhole enclosure of claim 3, wherein the wall of said dome is thickest in the region adjacent the manway and gradually decreases in thickness toward the mating end.

5. The manhole enclosure of claim 3, wherein said dome section includes a radially enlarged lip along its mating edge, said lip overlapping the mating edge of said tubular body.

6. The manhole enclosure of claim 3, wherein said endless band comprises glass fibers embedded in a matrix of hardened resin.

7. The manhole enclosure of claim 6, wherein at least some of the glass fibers embedded in said resin matrix extend continuously around said band, and other of said glass fibers extend transversely of said band and across the mated connection.

8. The manhole enclosure of claim 1, wherein both said body and said dome section are comprised of a matrix of polyester resin reinforced with randomly dispersed chopped glass strands.

9. The manhole enclosure of claim 8, wherein said tubular body further includes a sand filler in said resin matrix.

*10. A preformed manhole enclosure suitable for use underground comprising a one-piece cylindrical body formed of glass fiber reinforced plastic and a one-piece dome formed of glass fiber reinforced plastic and joined to an end of the cylindrical body, the dome including a downwardly concave generally spherically curved wall portion having a generally vertically extending lower end portion and an upwardly and inwardly inclined upper end portion and having generally parallel inner and outer surfaces of generally spherical curvature, a load bearing shoulder, and an integral stiffening collar defining a manway providing access to the interior of the cylindrical body, the load bearing shoulder circumscribing the collar, presenting a generally planar, normally upwardly facing annular surface for*

*supporting a load, and extending a distance radially inwardly of the cylindrical body from the inclined upper end portion of the downwardly concave curved wall portion to the stiffening collar, the stiffening collar being effective to stiffen the shoulder against deflection due to externally applied loads and extending generally perpendicularly from the shoulder oppositely from the curved wall portion a distance substantially equal to the distance the shoulder extends from the curved wall portion, and the curved wall portion extending from the cylindrical body sufficiently to space the load bearing shoulder therefrom a distance greater than half the radius of curvature of the curved wall portion and increasing gradually in thickness from a relatively thin portion adjacent the cylindrical body to a relatively thick portion adjacent the loading bearing shoulder.*

*11. A preformed manhole enclosure suitable for use underground comprising a one-piece cylindrical body formed of glass fiber reinforced plastic and a one-piece dome formed of glass fiber reinforced plastic and joined to an end of the cylindrical body, the dome including a downwardly concave generally spherically curved wall portion having a generally vertically extending lower end portion and an upwardly and inwardly inclined upper end portion and having generally parallel inner and outer surfaces of generally spherical curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending a distance radially inwardly of the cylindrical body from the inclined upper end portion of the downwardly concave curved wall portion to the stiffening collar, the stiffening collar being effective to stiffen the shoulder against deflection due to externally applied loads and extending generally perpendicularly from the shoulder oppositely from the curved wall portion, and the curved wall portion extending from the cylindrical body sufficiently to space the load bearing shoulder therefrom a distance greater than half the radius of curvature of the curved wall portion.*

*12. A manhole enclosure as claimed in claim 11 wherein the generally spherically curved wall portion increases gradually in thickness from a relatively thin portion adjacent the cylindrical body to a relatively thick portion adjacent the load bearing shoulder.*

*13. A manhole enclosure as claimed in claim 11 wherein the stiffening collar extends from the load bearing shoulder a distance substantially equal to the distance the shoulder extends from the curved wall portion.*

*14. A preformed manhole enclosure suitable for use underground comprising a one-piece cylindrical body formed of glass fiber reinforced plastic and a one-piece dome formed of glass fiber reinforced plastic and joined to an end of the cylindrical body, the dome including a downwardly concave generally spherically curved wall portion having a generally vertically extending lower end portion and an upwardly and inwardly inclined upper end portion and having generally parallel inner and outer surfaces of generally spherical curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending a distance radially inwardly of the cylindrical body from the inclined upper end portion of the downwardly concave curved wall portion to the stiffening collar, the stiffening collar being effective to stiffen the shoulder against deflection due to externally applied loads and extending generally perpendicularly from the shoulder oppositely from the curved wall portion, and the curved wall portion increasing gradually in thickness from a relatively thin portion adjacent the cylindrical body to a relatively thick portion adjacent the load bearing shoulder.*

*15. A manhole enclosure as claimed in claim 14 wherein the stiffening collar extends from the load bearing shoulder a distance substantially equal to the distance the shoulder extends from the curved wall portion.*

*16. A preformed manhole enclosure suitable for use underground comprising a one-piece cylindrical body formed of glass fiber reinforced plastic and a one-piece dome formed of glass fiber reinforced plastic and joined to an end of the cylindrical body, the dome including a downwardly concave generally spherically curved wall portion having a generally vertically extending lower end portion and an upwardly and inwardly inclined upper end portion and having generally parallel inner and outer surfaces of generally spherical curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending a distance radially inwardly of the cylindrical body from the inclined upper end portion of the downwardly concave curved wall portion to the stiffening collar, and the stiffening collar being effective to stiffen the shoulder against deflection due to externally applied loads and extending generally perpendicularly from the shoulder oppositely from the curved wall portion a distance substantially equal to the distance the shoulder extends from the curved wall portion.*

*17. A preformed manhole enclosure suitable for use underground comprising a one-piece cylindrical body formed of glass fiber reinforced plastic and a one-piece dome formed of glass fiber reinforced plastic and joined to an end of the cylindrical body, the dome including a downwardly concave curved wall portion having a generally vertically extending lower end portion and an upwardly and inwardly inclined upper end portion and having generally parallel inner and outer surfaces of continuous double curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending radially inwardly of the cylindrical body form the inclined upper end portion of the downwardly concave curved wall portion to the stiffening collar, the stiffening collar being effective to stiffen the shoulder against deflection due to externally applied loads and extending generally perpendicularly from the shoulder oppositely from the curved wall portion a distance substantially equal to the distance the shoulder extends from the curved wall portion, and the curved wall portion extending from the cylindrical body sufficiently to space the load bearing shoulder therefrom a distance greater than half the radius of the cylindrical body and increasing gradually in thickness from a relatively thin portion adjacent the cylindrical body to a relatively thick portion adjacent the load bearing shoulder.*

*18. A preformed manhole enclosure suitable for use underground comprising a one-piece cylindrical body formed of glass fiber reinforced plastic and a one-piece dome formed of glass fiber reinforced plastic and joined to an end of the cylindrical body, the dome including a down-*

*wardly concave curved wall portion having a generally vertically extending lower end portion and an upwardly and inwardly inclined upper end portion and having generally parallel inner and outer surfaces of continuous double curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending radially inwardly of the cylindrical body form the inclined upper end portion of the downwardly concave curved wall portion to the stiffening collar, the stiffening collar being effective to stiffen the shoulder against deflection due to externally applied loads and extending generally perpendicularly from the shoulder oppositely from the curved wall portion, and the curved wall portions extending from the cylindrical body sufficiently to space the load bearing shoulder therefrom a distance greater than half the radius of the cylindrical body.*

*19. A manhole enclosure as claimed in claim 18 wherein the dome and cylindrical body are joined by an endless band of reinforced plastic overlying and bonded to adjacent portions thereof.*

*20. A manhole enclosure as claimed in claim 19 wherein the endless band comprises fibers embedded in a matrix of hardened resin.*

*21. A manhole enclosure as claimed in claim 20 wherein some of the glass fibers of the endless band are continuous and extend circumferentially of the dome and cylindrical body and others extend axially of the dome and cylindrical body.*

*22. A manhole enclosure as claimed in claim 18 wherein the dome has a radially enlarged lip overlapping the adjacent end of the cylindrical body.*

*23. A manhole enclosure as claimed in claim 18 wherein the dome and cylindrical body each comprise a matrix of polyester resin reinforced with randomly dispersed chopped glass strands.*

*24. A manhole enclosure as claimed in claim 23 wherein the cylindrical body includes a sand filler in the resin matrix.*

*25. A preformed manhole enclosure suitable for use underground comprising a one-piece cylindricl body formed of glass fiber reinforced plastic and a one-piece dome formed of glass fiber reinforced plastic and joined to an end of the cylindrical body, the dome including a downwardly concave curved wall portion having a generally vertically extending lower end portion and an upwardly and inwardly inclined upper end portion and having generally parallel inner and outer surfaces of continuous double curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending radially inwardly of the cylindrical body from the inclined upper end portion of the downwardly concave curved wall portion to the stiffening collar, the stiffening collar being effective to stiffen the shoulder against deflection due to externally applied loads and extending generally perpendicularly from the shoulder oppositely from the curved wall portion, and the curved wall portion increasing gradually in thickness from a relatively thin portion adjacent the cylindrical body to a relatively thick portion adjacent the load bearing shoulder.*

*26. A manhole enclosure as claimed in claim 25 wherein the dome and cylindrical body are joined by an endless band of reinforced plastic overlying and bonded to adjacent portions thereof.*

*27. A manhole enclosure as claimed in claim 26 wherein the endless band comprises glass fibers embedded in a matrix of hardened resin.*

*28. A manhole enclosure as claimed in claim 27 wherein some of the glass fibers of the endless band are continuous and extend circumferentially of the dome and cylindrical body and others extend axially of the dome and cylindrical body.*

*29. A manhole enclosure as claimed in claim 25 wherein the dome has a radially enlarged lip overlapping the adjacent end of the cylindrical body.*

*30. A manhole enclosure as claimed in claim 25 wherein the dome and cylindrical body each comprise a matrix of polyester resin reinforced with randomly dispersed chopped glass strands.*

*31. A manhole enclosure as claimed in claim 30 wherein the cylindrical body includes a sand filler in the resin matrix.*

*32. A preformed manhole enclosure suitable for use underground comprising a one-piece cylindrical body formed of glass fiber reinforced plastic and a one-piece dome formed of glass fiber reinforced plastic and joined to an end of the cylindrical body, the dome including a downwardly concave curved wall portion, having a generally vertically extending lower end portion and an upwardly and inwardly inclined upper end portion and having generally parallel inner and outer surfaces of continuous double curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending a distance radially inwardly of the cylindrical body form the inclined upper end portion of the downwardly concave curved wall portion to the stiffening collar, and the stiffening collar being effective to stiffen the shoulder against deflection due to externally applied loads and extending generally perpendicularly from the shoulder oppositely from the curved wall portion a distance substantially equal to the distance the shoulder extends from the curved wall portion.*

*33. A manhole enclosure as claimed in claim 32 wherein the dome and cylindrical body are joined by an endless band of reinforced plastic overlying and bonded to adjacent portions thereof.*

*34. A manhole enclosure as claimed in claim 33 wherein the endless band comprises glass fibers embedded in a matrix of hardened resin.*

*35. A manhole enclosure as claimed in claim 34 wherein some of the glass fibers of the endless band are continuous and extend circumferentially of the dome and cylindrical body and others extend axially of the dome and cylindrical body.*

*36. A manhole enclosure as claimed in claim 32 wherein the dome has a radially enlarged lip overlapping the adjacent end of the cylindrical body.*

*37. A manhole enclosure as claimed in claim 32 wherein the dome and cylindrical body each comprise a matrix of polyester resin reinforced with randonly dispersed chopped glass strands.*

*38. A manhole enclosure as claimed in claim 37 wherein the cylindrical body includes a sand filler in the resin matrix.*

*39. A preformed manhole enclosure suitable for use underground comprising a one-piece cylindrical body formed of glass fiber reinforced plastic and a one-piece*

*dome formed of glass fiber reinforced plastic and joined to an end of the cylindrical body, the dome including a downwardly concave generally spherically curved wall portion having a generally vertically extending lower end portion and an upwardly and inwardly inclined upper end portion and having generally parallel inner and outer surfaces of generally spherical curvature, a load bearing shoulder, and an integral stiffening collar defining a manway providing access to the interior of the cylindrical body, the load bearing shoulder circumscribing the collar, presenting a generally planar, normally upwardly facing annular surface for supporting a load, and extending radially inwardly of the cylindrical body from the inclined upper end portion of the downwardly concave curve wall portion to the stiffening collar, and the stiffening collar being effective to stiffen the shoulder against deflection due to externally applied loads and extending generally perpendicularly from the shoulder oppositely form the curved wall portion.*

* * * * *